May 5, 1931.    J. A. OBERG    1,803,914
TIP-UP
Filed April 28, 1930    2 Sheets-Sheet 2
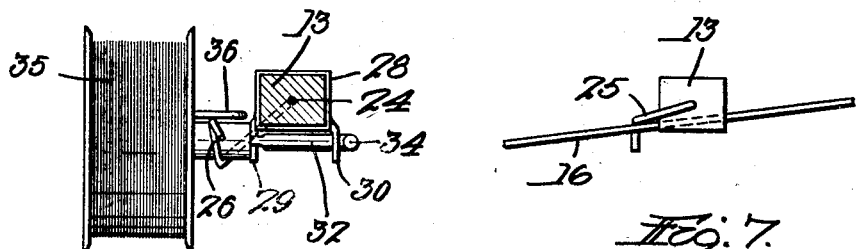
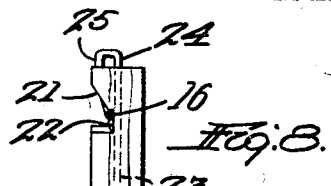
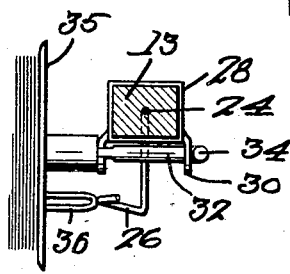
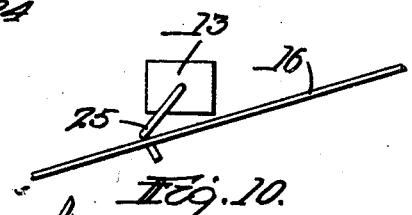
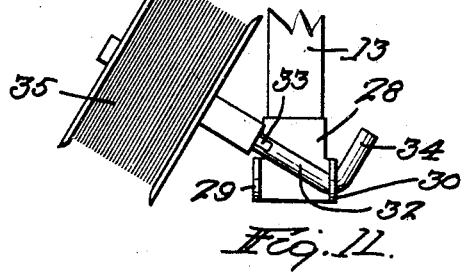
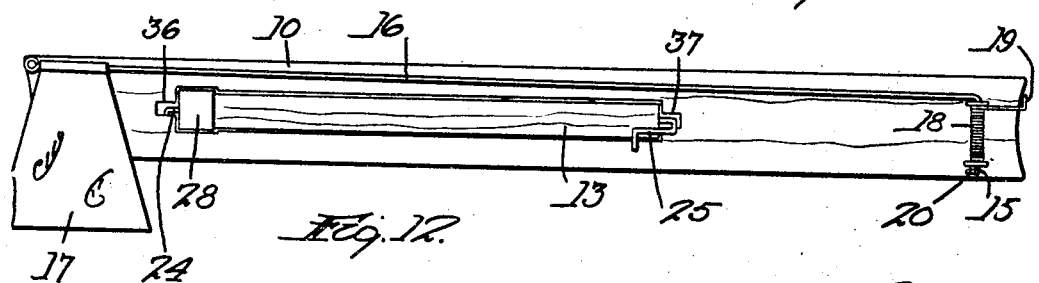
Inventor
John A. Oberg
By Attorneys
Southgate Fay & Hanby Patented May 5, 1931

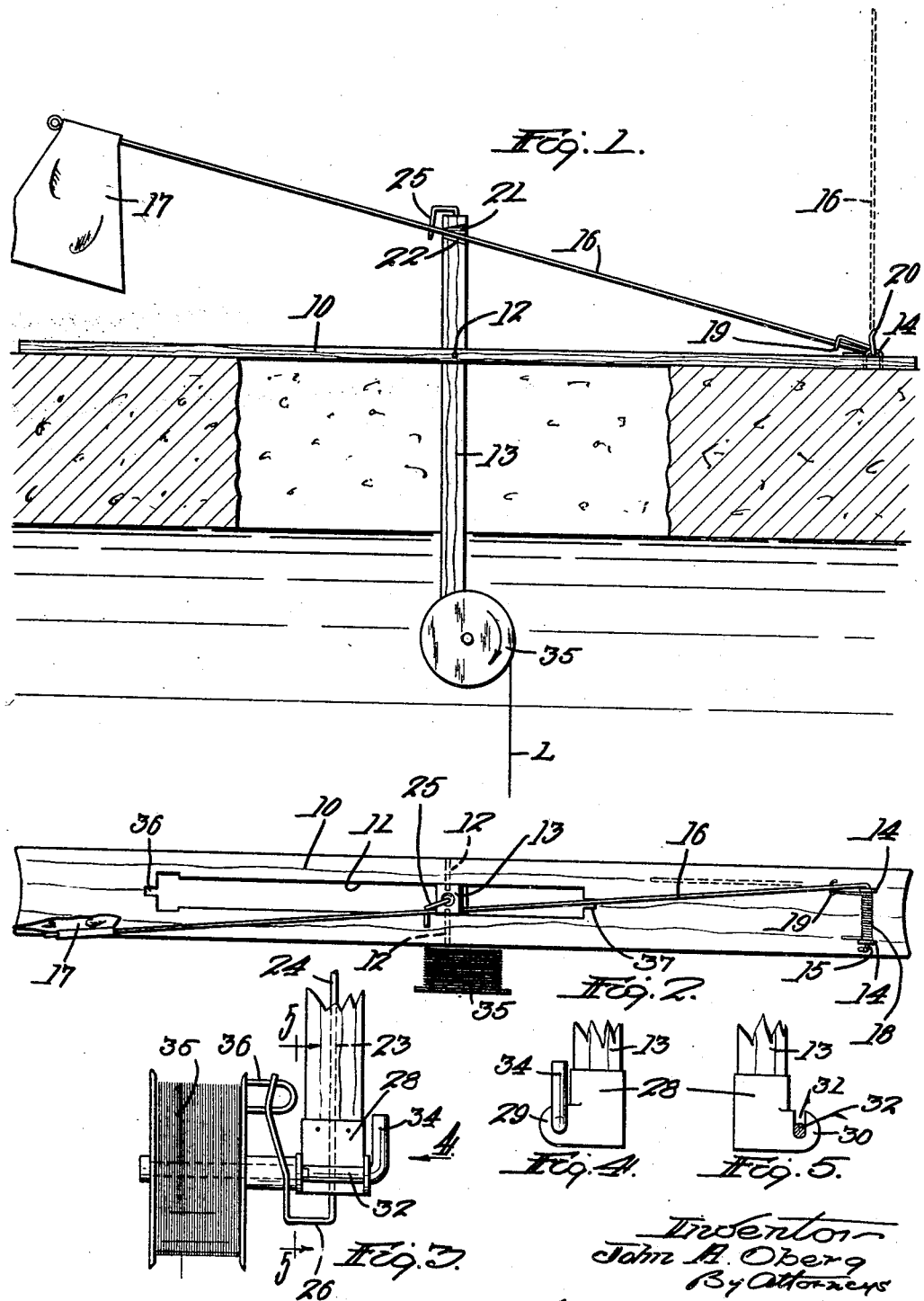

1,803,914

UNITED STATES PATENT OFFICE

JOHN A. OBERG, OF WORCESTER, MASSACHUSETTS

TIP-UP

Application filed April 28, 1930. Serial No. 447,869.

This invention relates to a signal device or so-called tip-up for use in fishing through the ice.

The principal objects of the invention are to provide a construction in which the flag or signal will be operatable at all times even though the surface of the water should freeze over and in fact to provide means whereby even if the most severe all night freezing takes place the device will still be in operative condition; to provide means for holding the reel under water; to provide this means with an effective method for preventing the entrance of water into the interior and prevent the freezing of the parts; to provide effective means extending from the reel up to a point above the ice for releasing the flag or other signal; to provide means for applying the reel detachably so it can be taken off for transportation and storage and to provide the rest of the structure in such form that it can be folded up into small compass.

Other objects and advantages of the invention will appear hereinafter.

Reference is to be had to the accompanying drawings, in which

Fig. 1 is a side view of a tip-up constructed in accordance with this invention and shown in operative position ready to be released upon the pulling of the line;

Fig. 2 is a plan of the same;

Fig. 3 is a view of the reel and its connected and supporting parts taken from one end of the whole device;

Fig. 4 is a side view of a part of the same looking in the direction of the arrow 4 in Fig. 3;

Fig. 5 is a sectional view on the line 5—5 of Fig. 4;

Fig. 6 is a plan of the reel and the parts for supporting it shown in the same position as in Fig. 1;

Fig. 7 is a plan of the signal or flag shown in the same position as Fig. 1;

Fig. 8 is a view of the top of the reel-holding member looking from the end of the tip-up;

Fig. 9 is a view similar to Fig. 6 but showing the reel rotated to a position for releasing the signal;

Fig. 10 is a view similar to Fig. 7 showing the releasing of the signal device;

Fig. 11 is a view taken in the same position as Fig. 3 with the exception that the reel is in the act of being disconnected from its supporting device, and Fig. 12 is a plan of the tip-up folded up in position for transportation.

Many devices have been designed for use as tip-ups for the purpose of displaying a flag or signal at any time when the fish gets on the hook. Most of them are open to the difficulty that on a very cold day, or if left over night, the freezing of the surface of the water by even a small amount will prevent the operation of the device.

This invention is designed chiefly to avoid that difficulty and also to provide the various parts in such form that they can be folded up into small compass for transportation and storage.

The invention is shown in a form comprising a horizontal supporting plate or board 10 provided with an opening 11 longitudinally located therein and with a pivot pin 12 extending across the opening. On this pivot pin is pivotally mounted a support 13 for the reel as will appear. This opening 11 is so shaped that this support can be turned up into horizontal position and will be capable of being retained in this opening in the plane of the plate 10.

As indicated in Fig. 1 this plate 10 is intended to be supported on the surface of the ice with the reel support 13 depending vertically from its pivot pin 12 down through the hole in the ice and into the water beneath. On the top of the board 10 at one end are a pair of staples 14 or the like in which is mounted a horizontal end 15 of a rod 16 which is provided with a flag 17 or other signal at the other end. There is also a coil spring 18 coiled on the end 15 with one end fixed to the board and the other end in the form of a hook 19 adapted to engage the rod 16.

In Figs. 1 and 2 this hook is shown as engaging the rod and in Fig. 12 is shown as disengaged. Of course when engaging the rod this spring provides a constant yielding tendency to pull the rod up as shown in dotted line position in Fig. 1 where it is stopped by a projection 20 on the end 15 and where the signal is displayed.

The support 13 is provided near the top with a notch 21 having a recess 22 therein for receiving the wire 16 and holding the flag down in the position shown in Fig. 1 under normal conditions. When so held a normal amount of swinging of the support 13 on its pivot will not release the flag.

The support 13 is provided with a passage 23 all the way down through it and in this passage is a wire rod 24. On its upper end the rod is provided with a bent end 25 or trigger normally resting in a position below the wire 16 and adapted when turned in a downward direction in Fig. 10 to force this wire out of the recess 22 and the notch 21 and allow the spring 18 to force it up. On the bottom this wire is provided with an arm 26 by which the rod 24 is turned on its axis as will appear. The passage 23 in which the rod 24 is located is filled with grease or the like to prevent the entrance of water into the passage and therefore to prevent freezing.

On the bottom of the support 13 is a metal bracket 28 practically surrounding the bottom and secured thereto. It is provided with two arms 29 and 30 at opposite sides and parallel with each other. The arm 29 is provided with a perforation therethrough and the arm 30 with an open topped slot 31. In this perforation and slot is adapted to rest a shaft 32. This shaft is flattened off at 33 to fit in the slot 31 and it is provided with an end 34 at right angles to its axis to limit the end motion. In order to put this shaft in position it is introduced in the manner shown in Fig. 11 with the end 34 passing through the perforation in the arm and then the flattened portion is brought down into the slot 31. Thus the shaft is detachably mounted but firmly fixed and not free to turn. On this shaft is mounted a freely rotating reel 35 having a projection 36 on one side.

The parts are set up as shown in Fig. 1. Now when a fish bites and draws down the line on the reel, the reel will turn and within one revolution the projection 36 will engage the arm 26 and turn the rod or wire 24. This brings the end 25 into position against the wire 16 so as to push it out of the notch and groove 21 and 22 and allow the spring 18 to raise it to the dotted line position as shown in Fig. 11.

When the device is to be carried away the reel and shaft 22 are taken off in the manner indicated in Fig. 11. The other parts can all be folded up in the position shown in Fig. 12, substantially in one plane, the hook 19 being pushed back and removed from contact with the wire 16.

It will be seen that the opening 11 is provided with notches 36 and 37 at its ends to receive the wires 26 and 25 respectively. In this way the device can be carried away and will take up only a small space in an automobile or other vehicle and also it can be stored without the use of excessive space. It is non-freezing and is always in condition for operation and is very convenient and simple in every way.

Although I have illustrated and described only one form of the invention I am aware of the fact that modifications can be made therein by any person skilled in the art without departing from the scope of the invention as expressed in the claims.

Therefore I do not wish to be limited in this respect but what I do claim is:—

1. In a tip-up, the combination with a plate adapted to rest on the ice and a spring-pressed signal device mounted thereon, of a support having a notch for receiving the signal device, a trigger for releasing the signal device, and a reel carried by said support under water and having means for operating the trigger.

2. In a fishing device, the combination with a plate adapted to rest on the ice and a spring-pressed signal device mounted thereon, of a trigger therefor comprising a support having a notch for receiving the signal device, and a reel carried by said support under water and having means for operating the trigger, the trigger consisting of a wire extending down through the center of said support and having projections at the lower and upper ends for turning the wire and releasing the signal device respectively.

3. In a fishing device, the combination with a plate adapted to rest on the ice and a spring-pressed signal device mounted thereon, of a support having a notch for receiving the signal device, a roll carried by said support under water, the trigger comprising a rod extending down through the support and having projections at the lower and upper ends, the upper one constituting a trigger for releasing the signal device, and means on the reel for operating said lower end to move the trigger.

4. In a device for use in fishing, the combination with a plate adapted to be supported on the ice over a hole therein, of a spring-pressed signal carried by the plate, a support mounted on the plate in a vertical position with the lower end extending down through the hole and into the water, a trigger carried by said support having an end at the top adapted to disengage the signal and an arm at the bottom, and a reel rotatably carried by the bottom of said support and having a projection for engaging said arm during a rotation of the reel to operate the trigger.

5. In a device for use in fishing through the ice, the combination with a plate adapted to be supported on the ice over a hole therein, of a spring-pressed signal carried by the plate, said plate having an opening therethrough, a support pivotally mounted in said opening and adapted to fit in the opening when swung into the plane of the plate and adapted to be swung to a vertical position with the lower end extending down through the hole and into the water, a trigger carried by said support having an end at the top adapted to disengage the signal and an arm at the bottom by which it is operated and a reel rotatably carried by the bottom of said support and having a projection for engaging said arm during a rotation of the reel to operate the trigger.

6. In a device for use in fishing, the combination with a plate adapted to be supported on the ice over a hole therein, of a signal device pivotally mounted on said plate at one end, a spring having a hook detachably engaging said signal device to normally force it up to substantially vertical position, said signal device having a stop for preventing its going beyond vertical position, a support mounted on the plate and projecting above and below it and having a notch in the side for receiving the signal device to hold it down, and a trigger carried by said support for disengaging the signal device from the notch.

7. In a fishing device, the combination with a plate adapted to be supported on the ice, of a signal device carried thereby, a support connected with the plate and having means for holding the signal device down, means connected with said support for releasing the signal device from the notch, said support extending down into the water and having means on the bottom for holding a shaft, a shaft detachably carried by said means, a reel for a fishing line freely rotatable on the shaft, and means on the reel for causing the signal device to be released.

8. In a device for use in fishing, the combination of a support extending down into the water, a signal device, said support having means for holding the signal device down, means connected with the support for releasing the signal device, two bearings one of them having an open top carried by the support at the bottom, a shaft having a bent end and a flat place adapted to be detachably supported by the bearings, and a fishline reel rotatably carried by said shaft.

In testimony whereof I have hereunto affixed my signature.

JOHN A. OBERG.